(12) United States Patent
Mark et al.

(10) Patent No.: US 7,676,032 B2
(45) Date of Patent: Mar. 9, 2010

(54) METHOD AND SYSTEM FOR DETERMINING MAXIMUM TRANSACTIONS WITHIN A COMMUNICATIONS NETWORK

(75) Inventors: Bruce Allen Mark, Olathe, KS (US); Richard Michael Wyett, Spring Hill, KS (US); Jianzhou Chen, Olathe, KS (US); Dean Lee Saghier, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1469 days.

(21) Appl. No.: 11/020,761

(22) Filed: Dec. 23, 2004

(65) Prior Publication Data

US 2006/0140368 A1 Jun. 29, 2006

(51) Int. Cl.
*H04M 15/00* (2006.01)
(52) U.S. Cl. .................. 379/112.06; 379/112.01; 379/122; 707/7; 707/10; 707/100; 707/200; 709/203; 709/219
(58) Field of Classification Search ............ 379/112.01, 379/112.06, 112.07, 112.08, 114.01, 115.01, 379/116, 120, 121.01, 121.04, 122, 126, 379/130, 133–136; 707/1, 7, 10, 100, 102, 707/200; 709/203, 219
See application file for complete search history.

(56) References Cited

U.S. PATENT DOCUMENTS

| | | | | | |
|---|---|---|---|---|---|
| 6,385,301 | B1 * | 5/2002 | Nolting et al. | ........... | 379/32.01 |
| 6,640,244 | B1 * | 10/2003 | Bowman-Amuah | ......... | 709/207 |
| 6,947,937 | B1 * | 9/2005 | Winter et al. | ................ | 707/7 |
| 7,295,829 | B2 * | 11/2007 | Boehmke | ................... | 455/406 |
| 2001/0028706 | A1 * | 10/2001 | Nolting | ...................... | 379/134 |

* cited by examiner

*Primary Examiner*—Binh K Tieu

(57) ABSTRACT

A call-transaction forecasting tool taking the form of a computer-implemented method and medium in some embodiments is provided for retrieving, aggregating, sorting, and determining one or more maximum transactions within a communications network. The tool automates the process of manually extracting and analyzing call transactions pertaining to call-duration, call volume, traffic usage, bandwidth usage, processing usage and memory usage in order to properly forecast and predict future network growth and capacity within a providers network. The computer-implemented method includes retrieving transaction data files from a switch or server, merging the files in a commonly shared data structure, identifying one or more maximum transaction counts based upon an associated period of time, and displaying the maximum counts and associated period of time.

30 Claims, 4 Drawing Sheets

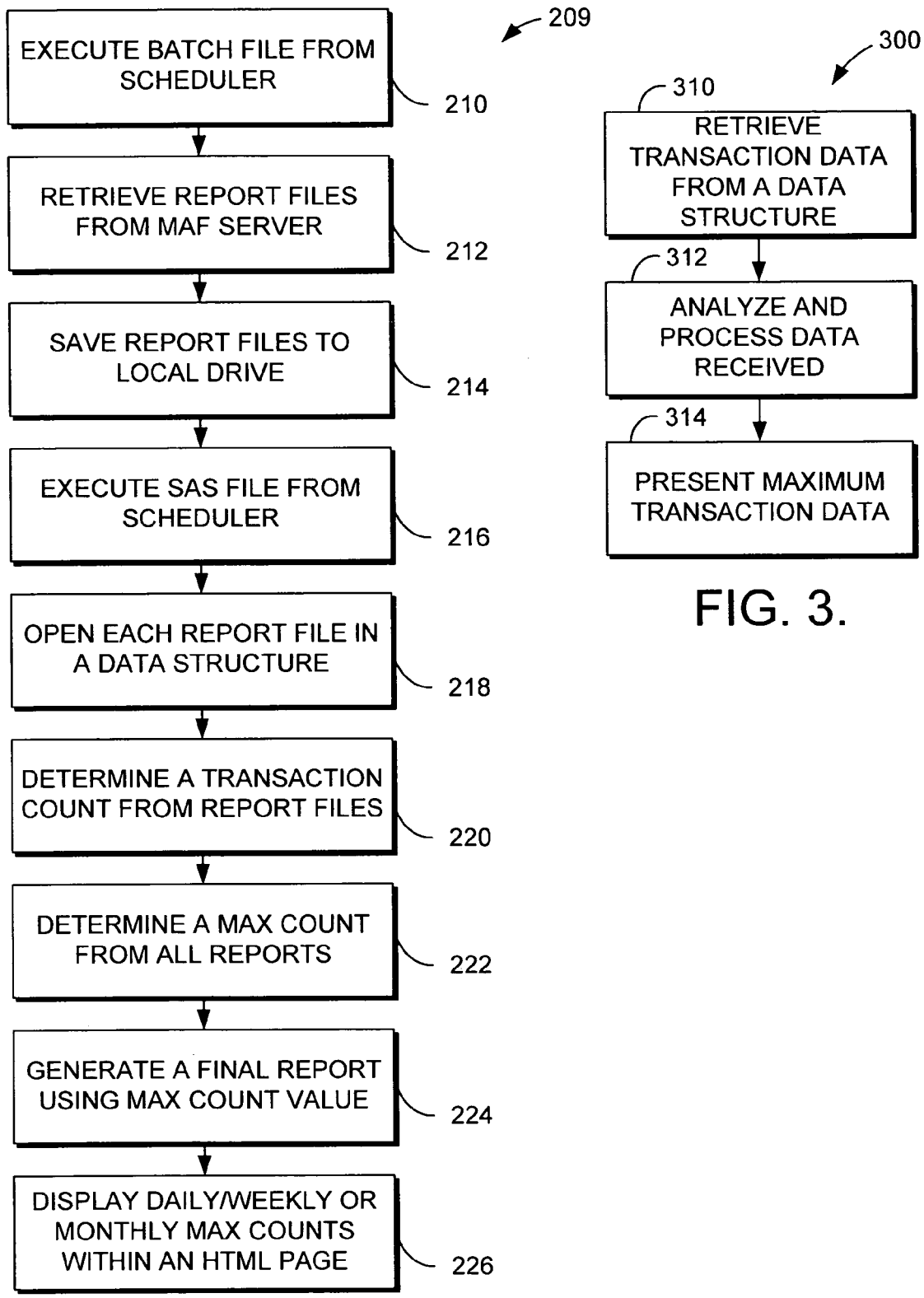

MAF MAX HOURLY COUNT - TOP 5

| OBS | YEAR | MONTH | DAY | HOUR | COUNT |
|---|---|---|---|---|---|
| 1 | 2004 | 9 | 10 | 16 | 32300000 |
| 2 | 2004 | 9 | 10 | 15 | 31337691 |
| 3 | 2004 | 9 | 10 | 17 | 31201867 |
| 4 | 2004 | 9 | 17 | 17 | 31141825 |
| 5 | 2004 | 9 | 15 | 16 | 31100000 |

FIG. 4.

MAF MAX DAILY COUNT - TOP 5

| OBS | YEAR | MONTH | DAY | COUNT |
|---|---|---|---|---|
| 1 | 2004 | 9 | 10 | 449693925 |
| 2 | 2004 | 9 | 17 | 442599305 |
| 3 | 2004 | 9 | 18 | 442265944 |
| 4 | 2004 | 9 | 3 | 441109815 |
| 5 | 2004 | 9 | 11 | 440854218 |

FIG. 5.

BALANCE MAX DAILY COUNT - TOP 5

| OBS | DATE | YEAR | MONTH | OUTPUTS |
|---|---|---|---|---|
| 1 | 09/17/2004 | 2004 | 9 | 1752669156 |
| 2 | 09/10/2004 | 2004 | 9 | 1691129255 |
| 3 | 09/18/2004 | 2004 | 9 | 1688285607 |
| 4 | 09/11/2004 | 2004 | 9 | 1646914939 |
| 5 | 09/03/2004 | 2004 | 9 | 1604268192 |

FIG. 6.

METHOD AND SYSTEM FOR DETERMINING MAXIMUM TRANSACTIONS WITHIN A COMMUNICATIONS NETWORK

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

In a communications network, a provider is responsible for predicting and forecasting customer growth, monitoring traffic volume over the network, and determining when to add or update equipment based on increasing month-to-month demands. Therefore, it is critical for a provider to monitor and determine call-transaction information relating to call duration, call volume, bandwidth capabilities, memory usage, processing usage, and combinations thereof for determining when to increase or add additional hardware within the network. Determining when new equipment should be implemented within the network is important to maintain a consistent and reliable network.

Forecasting a capacity plan within a communications network has become a burdensome endeavor and chore for providers. A network comprised of tens or hundreds of voice- or data-switching facilities requires a provider to extract call-detail records or files from each switch facility, and manually generate a forecast using a spreadsheet or database program. Some of the major problems associated with performing a forecast include: manual extraction of hundreds or thousands of files associated with a months worth of call-transaction data, combining all the information associated with each file into a single merged data file, formatting the data properly into related columns or fields, sorting and formatting a proper field associated with the merged data, and creating a report by identifying and inserting the maximum transaction count into a separate spreadsheet or database. A provider may have to perform these processes on a monthly, and sometimes weekly basis. Moreover, the steps shown above require a relatively high amount of time, resources, and manpower to perform such a task for each and every switch.

The need exists, therefore, for an improved method that would allow a provider to preschedule and execute a forecast on a computer by retrieving and sorting a set of transaction files from a switch to determine the maximum transaction counts associated within a given hour, day, month, or year and present the forecast in a simple readable format.

SUMMARY OF THE INVENTION

The present invention is defined by the claims below. In one aspect, an embodiment of the present invention provides a computer-implemented method for using call transactions to forecast needs of processing resources. The method includes receiving one or more data files having at least one record of information relating to one or more call transactions, aggregating all or a portion of the information into a data structure, identifying one or more maximum call transactions, and presenting the one or more maximum call transactions.

In another aspect, an embodiment of the present invention provides a computer-implemented method for using call transactions to forecast a demand of processing resources in a communications network. The method includes receiving one or more data files relating to call-transaction data, where the call-transaction data includes a set of time periods and a corresponding count of transactions associated with the set of time periods, aggregating all or a portion of the call-transaction data into a data structure, identifying a maximum count from the call-transaction data, identifying a time indication corresponding to the maximum count, and presenting the maximum count and the corresponding time indication.

In still another aspect, an embodiment of the present invention provides a computer-implemented method for monitoring hourly call transactions to forecast demand for processing resources. The method comprises scheduling automatic retrieval of one or more data files from a switch or server, retrieving said one or more data files based upon a scheduled indication of time, merging the one or more data files into a data structure, determining at least one maximum-transaction indication from the list, and presenting the maximum-transaction indication.

In a final aspect of the invention, a method for determining a peak-transaction value corresponding to an hour in order to forecast peak-processing usage on a communications network. The method includes receiving one or more sets of transaction data from one or more data structures, wherein said one or more sets of transaction data includes a transaction count, an hour, and a date, merging the one or more sets of transaction data into a data structure for each set of transaction data, identifying a peak hour corresponding to the maximum indication, and presenting the peak hour and the maximum indication.

The present invention offers several practical applications in the technical arts, including automating the development steps involved with forecasting into a less resource-intensive process. This method of performing an automatic forecast on a network requires less resources associated with the development time and requires a significant reduction in time and manpower. By automating the forecast, a network provider can properly predict and determine when to increase network capacity in regards to processing power, call duration, memory utilization, trunk utilization, bandwidth usage, and traffic capacity.

BRIEF DESCRIPTION OF THE SEVERAL VIEWS OF THE DRAWING

The present invention is described in detail below with reference to the attached drawing figures, which are expressly incorporated by reference herein, and wherein:

FIG. 2B is a flow diagram depicting more detailed functional steps offered by an exemplary embodiment of the present invention;

FIG. 3 is a flow diagram depicting simplified steps of an exemplary embodiment of the present invention;

FIG. 4 is a table depicting an exemplary presentation of maximum hourly counts of the present invention;

FIG. 5 is a table depicting an exemplary presentation of maximum daily counts of the present invention; and FIG. 6 is a table depicting an exemplary presentation of balanced maximum daily counts of the present invention.

DETAILED DESCRIPTION OF THE INVENTION

Figure 1:
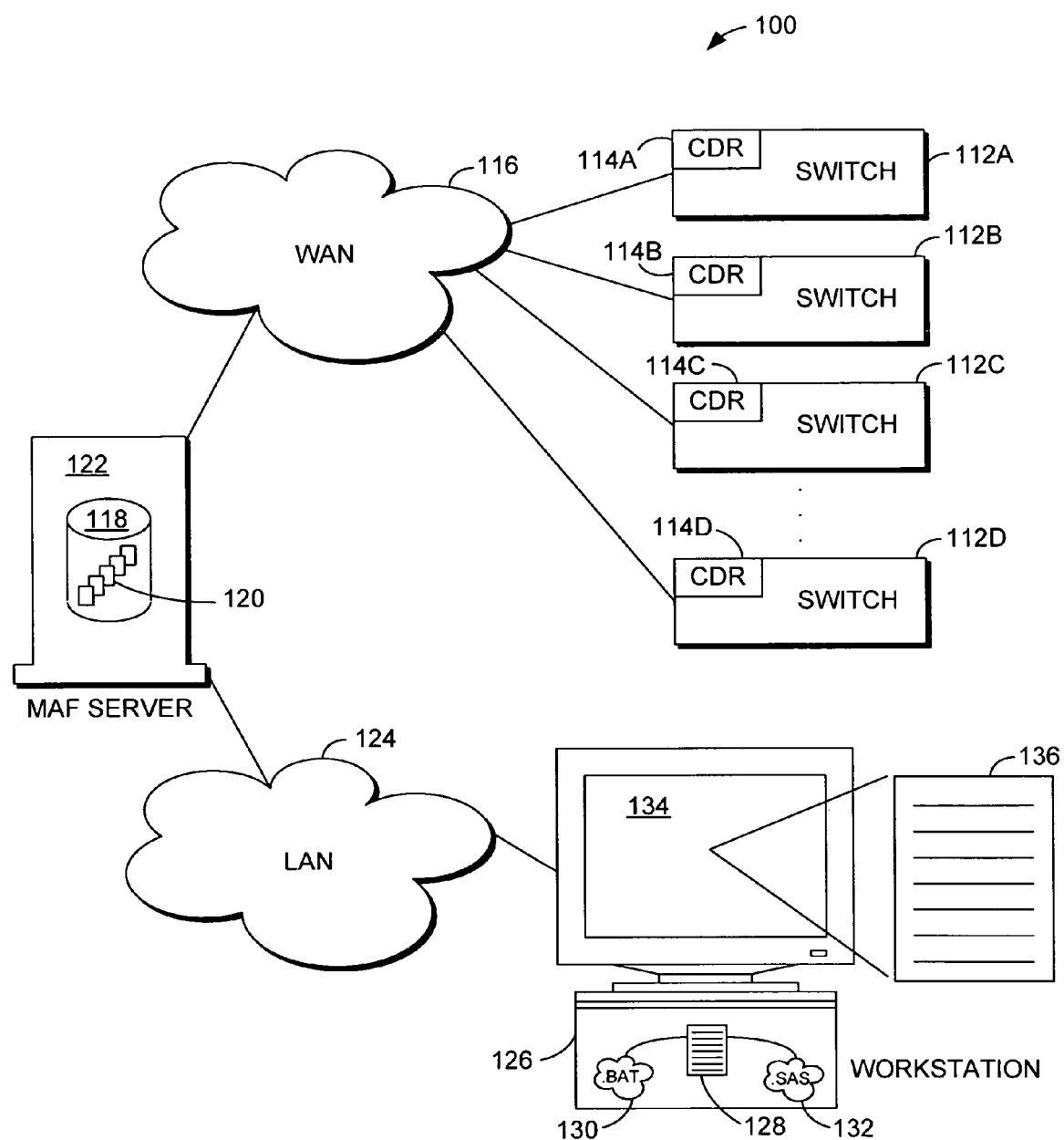
FIG. 1 is a schematic illustration of a communications network comprised of one or more networking resources in accordance with an embodiment of the present invention.

Embodiments of the invention provide an improved method for developing a capacity plan forecast within a communications network. A communications network is a network that provides, for example, voice, data, and/or media transactions. It is a vital task of a provider to perform frequent forecasts and predictions relating to the growth of the network infrastructure. By maintaining a historical account of weekly or monthly forecasts, a provider can better serve its clients and customers. As customer transactions continue to grow exponentially, a tool for performing a forecast becomes a critical asset.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDR | Call-Detail Record |
| CPU | Central Processing Unit |
| HTML | Hypertext Markup Language |
| LAN | Local Area Network |
| MAF | Message Acquisition and Formatting System |
| MOU | Minutes of Use |
| WAN | Wide Area Network |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In one embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are the means of communicating with the same. By way of example, and without limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, Digital Versatile Discs (DVD), holographic media or other optical storage devices, magnetic cassettes, magnetic tape, magnetic disk storage, and other magnetic storage devices. These memory components can store data momentarily, temporarily, and/or permanently. Combinations of the above are included within the scope of computer-readable media.

Referring now to FIG. 1, a schematic diagram 100 of a communications network illustrates the various components involved with transferring data between one or more networking components. Network diagram 100 depicts a communications network having a set of switches (or servers) 112A-112D responsible for creating log files or call-detail records 114A-114D of network-transaction data. Switch 112A represents a switching facility located and serving one or more geographical locations to a set of customers.

Switches 112B, 112C, and 112D represent additional switching facilities that may assist and serve other switching facilities, or provide call or data transactions in one or more geographically remote towns or cities. In one embodiment, there may be one or a hundred switches located within a provider's network. Each switch is responsible for logging and recording call-detail record files (hereafter "CDRs") composed of specific network data or voice transactions. Network transactions may include an identification number, a yearly date, an hour, a transaction count, and a status indication. CDRs 114A-114D are generated and stored within each of their respective switches and provide the information necessary to forecast and predict future growth of network capacity.

A server, referenced herein as "a Message Acquisition and Formatting System (MAF)" server 122 retrieves and aggregates a set of call-detail records (CDRs) 14A-114D from switches 112A-112D over WAN 116. Once the CDRs are retrieved from the switch, MAF server 122 performs a compression function that converts each of the CDRs 114A-114D into a report file (referred to herein as a ".rep" file), and stores the dated report files 120 into an identifiable directory on storage device 118; which may be, for example, a hard-drive, CD or DVD drive, or any other compatible storage device common to one skilled in the art.

Report files 120 may include a dated report file having call-duration transaction counts or a balance report file, which refers to the amount of storage in terabytes that MAF server 122 used out of its total storage resources during a given month. To better describe the content of CDRs and report files, CDRs are recorded log files generated by the switch that contain network-usage transactions relating to start times, stop times, and call duration of circuit-switched or packet-switched networks.

In one embodiment, a set of fields are created within the CDRs, which may include: an identifier, a system creation date, a system creation time, a file status, a next-paging name, and a next-file alliance associated with each transaction count. In an embodiment of the present invention, a maximum transaction count of 50,000 bytes is used, but the size of data packet size is not limited to any particular minimum or maximum size within the present invention. One or more CDRs representing a single hour may be generated depending on the volume of call-transaction occurrences exceeding the 50,000 bytes within a log file. On a given day when an increase in traffic occurs, one or more call-detail records may be created for a particular hour and generate a maximum transaction count of 50,000 bytes for each hour received. Moreover, transaction counts within the present invention may represent call-duration transaction counts but are not limited to any particular type of call transaction. Other transactions may also include: access/failure counts, bandwidth-usage data, call-volume data, and traffic-usage information such as minutes-of-use (MOUs) or Erlang data.

To better understand transaction counts within the present invention, a transaction count within a communications network, may be, for example, call-duration data logged during a period of time, call volume occurring within a switch, or it could be the call or data traffic over a network trunk that is usually represented by the total minutes of use (MOUs), or the number of circuits being used within a one-hour period of time (commonly referred to as an Erlang). Transaction counts may also be represented by the bandwidth usage of the associated media (circuit trunks, fiber trunks, or wireless communication links) being used within the network. Further, the transaction counts may be represented in a number format from that of bytes, and may be represented in a different number format, such as, for example, an integer, ASCII, binary, or one or more other commonly known and used formats.

Figure 2A:
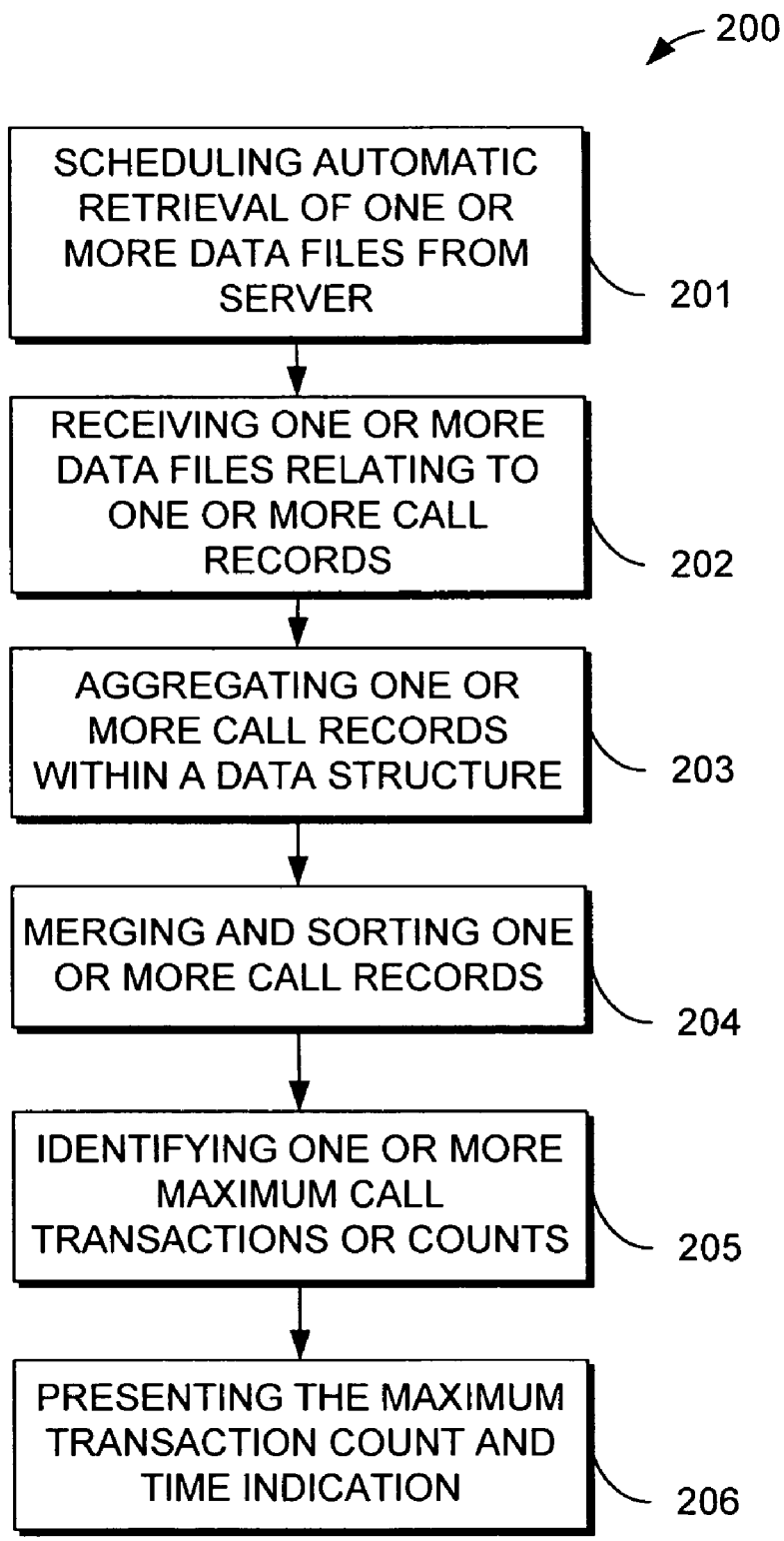
FIG. 2A is a flow diagram depicting an exemplary embodiment of the present invention.

Turning now to FIG. 2A, a flow diagram 200 is shown depicting the steps performed in one embodiment of the present invention. At a step 201, one or more data files are scheduled to be automatically retrieved from a server, or more particularly (as shown in FIG. 1), a Message Acquisition and Formatting system (MAF) server 122, which retrieves data files 120 from a set of switching facilities 112A-112D. A scheduling software component 128 indicates a specific time and date to automatically retrieve data files 120 from MAF Server 122. In an alternative embodiment, MAF Server 122 may be absent or bypassed allowing data files 120 to be received directly from switches 112A-112D.

Once the scheduler initiates the automatic retrieval of data files, workstation 126 begins receiving one or more data files relating to one or more call records, as depicted at a step 202. Workstation 126 receives the call records 120 and places them within either system memory, or more preferably, in a directory or temporary directory of a readable storage device, such as, for example, a hard-drive, a tape drive, or other fixed or removable storage devices. To do so, scheduling tool 128, upon commencement of a scheduled retrieval, will launch a programmatic code segment, such as a batch file 130, or other executable file type, that is scripted by code to create a directory on workstation 126 to receive the incoming data files 120 from MAF Server 122.

Scheduling tool 128 then employs a statistical analysis system file (referenced to herein as a ".SAS" file) 132 for aggregating one or more call records within a data structure, as shown at a step 203. Statistical analysis system file 132 provides scheduler 128 an executable file for automating the aggregation of call-record files into a shared data structure, which may be, for example, a document, a spreadsheet, or a database. This process allows the information within multiple call records to be extracted and inserted within a common data structure for later data manipulation. Moreover, statistical analysis system file 132 is not limited to any particular name or extension, such as a (.SAS) extension, and may be, for example, any compiled/executable file operable to aggregate data or call-record files into a common data structure, which is common understanding to one skilled in the art.

At a step 204, statistical analysis system file 132 continues to execute by merging and sorting one or more call records. To perform this step, statistical analysis system file 132 is scripted and coded to merge related data and perform a sort based on the maximum call transactions or counts.

Once the data has been sorted accordingly, statistical analysis file 132 proceeds by identifying one or more maximum call transactions or counts, as shown at a step 205. This step is performed by searching the sorted maximum call transaction/counts values for one or more of the highest transaction/count values. In one embodiment of the present invention, the top-five values are identified and retrieved. The top-five maximum call transactions or counts are formatted and properly coded into an HTML file, but the present invention is not limited to any particular format, and may be formatted into a document, a report, a database, or any other useful file format.

At a step 206, the formatted and coded file is used for presenting the maximum transaction count and time indication. This provides a user or system provider a presentation of the data on the Internet, within a report, within a document, or as part of a spreadsheet or database. The presentation allows the maximum transaction counts and time indication to be displayed for a particular hour, day, week, or month.

Referring now to FIG. 1 and FIG. 2B, process steps 209 will be described in detail with reference to network diagram 100. Within workstation 126, scheduler 128 is used to initiate an executable file 130 for retrieving and processing report files 120 from server 122 from a predetermined and prescheduled period of time. Scheduler 128 may be a software product running on workstation 126, such as, for example, MICROSOFT Scheduler or any other scheduling software capable of scheduling and executing files in a predetermined period of time. Workstation 126 may be either a single-user computer workstation or a sophisticated processing server located within the network. Forecasts may be performed on a daily, weekly, monthly, or any other basis.

Scheduler 128 automates the task of retrieving files from the MAF server 122 by executing a prescheduled file such as, for example, a batch (.bat) file or other useable file 210. At a step 212, the batch file (.bat) 210 retrieves report files 120 from MAF server 122 across LAN 124. Report files (.rep files) 120 are located within a storage device 118 of MAF Server 122. Additionally, MAF server 122 is responsible for retrieving and compressing CDRs into report files using wide-area network (WAN) 116 connected to each and every switch within the communications network. Scheduler 128 is capable of accessing each and every report file 120 located within MAF server 122. Scheduler 128 may be scheduled to execute files 130 and 132 on a periodic basis, and store the retrieved report files 120 on a local drive of workstation 126. In one embodiment, files are stored in system memory of workstation 126, or a temporary directory on the local drive of workstation 126.

Once report files 120 are retrieved from MAF server 122, report files 120 are saved to the local drive within workstation 126. This step is shown as process step 214. During the retrieval- and save-process steps, workstation 126 copies the dated report files 120 from MAF server 122 to its local drive. This keeps all report files 120 within a collection under a dated directory created by the MAF Server.

At a step 216, the prescheduled statistical analysis system executable file 132 (hereafter ".SAS file") stored on a local drive within workstation 126 is executed. .SAS file 132 is responsible for aggregating, sorting, extracting and presenting a daily, weekly, or monthly maximum count of the transactions.

At a step 218, .SAS file 132 is responsible for opening a data structure (a document, spreadsheet, or a database table) that creates column header fields based upon identified field headers within a report file. .SAS file 132 aggregates a set of files associated with a certain day, week, month, or combination thereof, and inserts the report information of each file under a pertinent header field within the data structure. .SAS file 132 is also responsible for preprocessing each and every report file's data by sorting and creating a list in either an ascending or descending order. In one embodiment of the present invention, the maximum count or maximum transaction count is sorted in a top-to-bottom descending order for determining the highest-transaction count from all report files.

As shown at a step 220, .SAS file 132 determines a transaction count from report files 120. Again, this is performed by sorting and determining the maximum transaction count based on a maximum count descending list that occurs from the sort. Upon determining the maximum transaction counts within the data structure, .SAS file 132 is responsible for determining a maximum count from all reports as shown at a step 222. Workstation 126 identifies the maximum count and selects at least one or more of the maximum counts within the data structure. As previously discussed, the maximum count is a call-usage identifier, such as, for example, a call-volume, trunk-usage, or time-tracking indication. At a step 224, a final report is generated using the selected maximum-count values. In one embodiment, the top-five maximum-count values are selected and displayed within the generated report.

Once a final report is generated from the maximum-count value as shown in 224, the final report is coded and displayed into an HTML file and displayed over the Internet. At a step 226, the HTML page displays the hourly, daily, weekly, and/or monthly, etc., maximum counts within an HTML page. The present invention may also present the forecast in a document report or just simply display the information within a report 136 on an electronic display or graphical-user interface such as a computer terminal or monitor 134.

Turning now to FIG. 3, process 300 illustrates a higher-level overview of steps 209 illustrated in FIG. 2. Process steps 300 utilizes only three steps to show the simplicity of the present invention. At a step 310, the scheduler retrieves transaction data from a data structure. At a step 312, the scheduler 128 is used to analyze and process the received data. Lastly, at a step 314, the invention presents the maximum-transaction data and hour, day, month, or year to a user. Process steps 300 provides how the process steps of 200 and 209 are condensed to a simple overview of the present invention.

In an exemplary embodiment of the present invention, a voice or telephone network may be substituted with a data packet network. A provider may also utilize a switch or server to determine the number of data packet transactions that are sent across the network and logged to a daily record within the switch or server. The transaction count may be data packet counts, bandwidth usage, data-utilization volume based on CPU processing, or just a total count of the number of users accessing the switch or server. This transaction-count information may be logged as a historical record for forecasting and predicting network resources in a future period of time.

Referring now to FIG. 4, a MAF Max Hourly Count Top Five table 400 depicts a maximum hourly count associated with the present invention. Within table 400, six fields are shown to represent the maximum hourly count within a monthly period 410A-410F is shown. The observation field (OBS) 410A represents the field with the highest-to-lowest top-five counts during a month. The year 410B, is shown as the year in which the count was made. The month 410C designates the month of the maximum transaction count. The day 410D represents the day of the month when the maximum transaction occurred. The hour 410E represents the hour within a day that the maximum transaction occurred within a 24-hour time frame. Lastly, the count 410F, represents the total transaction count that occurred within the hour of the observation ranking shown in 410A. Table 400 depicts the highest hourly count transaction that was made within a single hour of a day. This, among other things, allows the provider to gain a greater understanding of which hour and typically what the maximum transaction count is within a particular month based on an hour, which is the peak hour.

Referring now to FIG. 5, an exemplary MAF Maximum Daily Count Top-Five table 500 is shown to depict the top-five maximum transaction counts within a particular day. Table 500 provides five fields 510A-510E in order to present a provider an understanding of the maximum daily count. The observation field (OBS) 510A shows the top-five best day having the highest daily transaction counts. A year field 510B displays the year in which the maximum daily transaction count occurred, along with the month 510C and day 510D. The total call transaction count 510E represents a days total call transaction count in an integer format. The count format may also be a value within one or more numbering formats, such as, for example, a decimal, binary, hexadecimal, or octal format which is familiar to one of ordinary skill in the art.

In FIG. 6, the Balance Maximum Daily Count Top-Five table 600 illustrates the maximum daily balance counts or outputs in terabytes for a particular month. This allows a provider to better understand and predict the storage requirement demands needed within a switch or server. Table 600 provides five fields 610A-610E that enables the provider to determine a particular date, year, month, and output value corresponding to the total transaction counts within a daily count. The observation field (OBS) 610A represents the top-five outputs in a descending order. A date field 610B, a year field 610C, and a month field 610D provides the date, year, and month associated with maximum outputs having the highest overall balance within a given period of time. Outputs Field 610E displays the balance maximum daily counts of the overall top-five highest maximum balance counts in a given month.

This disclosure sets forth illustrative examples of a method for providing a provider of a communications network with an automatic method of retrieving, aggregating, sorting, and presenting maximum transaction counts, dates, and times for any given day, week, or month. The present invention is not limited to any particular type of communication resource or network; nor is it limited to any given system or tool or protocol of any type. Many aspects of the present invention may be implemented using computer software embodied on computer readable media to be executed by a computer or other machine. The use of such computer software may be particularly useful as part of a communications network tool. The present invention is not limited to the use of any particular programming language, nor is it limited to the use of any particular computer or other machine to execute the machine-readable code. This and other variations of the invention will be apparent to one of ordinary skill in the art.

Certain features and subcombinations are of utility and may be employed without reference to other features and subcombinations and are contemplated within the scope of the claims. Not all steps listed in the various figures need to be carried out in the specific order described.

What is claimed is:

1. One or more computer-storage media having computer-useable instructions embodied thereon for performing a method of using a server to process information related to call transactions to forecast demand for processing resources, the method comprising:

receiving, at a server, a plurality of data files from each of a plurality of switches on the communications network, each data file having at least one record of information, the information relating to one or more call transactions;

generating a plurality of report files by converting each data file into a report file, wherein said converting comprises performing a compression function on the data file;

creating an identifiable directory on a storage device associated with the server;

storing each data file in the identifiable directory on the storage device;

aggregating a set of the plurality of report files into a data structure, wherein said aggregating comprises aggregating counts of the call transactions;

sorting the set of report files based on maximum call transactions such that the sorted set of report files are organized in a descending order according to maximum call transaction counts, wherein a maximum call transaction count comprises one or more of a call-volume indication and a trunk-usage indication;

automatically identifying one or more maximum call transactions within the data structure by searching the sorted maximum call transaction counts for one or more of the highest call transaction counts; and automatically presenting the one or more maximum call transactions.

2. The method of claim 1, wherein the one or more call transactions provides a date, a time, and a transaction count.

3. The method of claim 2, wherein the transaction count comprises at least one of the following:

a call-duration count;
a call-volume data count;
a traffic-usage count;
a bandwidth-usage count;
a CPU-utilization count;
an access/failure count;
a data-utilization count; and
a data-packet count.

4. The method of claim 1, wherein the data structure is a descending sorted spreadsheet.

5. The method of claim 1, wherein the one or more maximum call transactions corresponds to one or more hours, the one or more hours being one or more peak hours.

6. The method of claim 5, wherein the one or more maximum call transactions and the one or more peak hours are selected and transferred into a second data structure.

7. The method of claim 6, wherein the second data structure is a document file, an HTML file, a spreadsheet file, a database file, a graphics file, or a combination thereof.

8. The method of claim 1, wherein presenting the one or more maximum call transactions further comprises:

displaying the one or more maximum call transactions within a printed report document;

displaying the one or more maximum call transactions on the Internet; and displaying the one or more maximum call transactions within an electronic display.

9. One or more computer-storage media having computer-useable instructions embodied thereon for performing a method of using a single-user computer workstation to process information related to call transactions to forecast demand for processing resources, the method comprising:

receiving, at a single-user computer workstation, one or more data files relating to call-transaction data, the call-transaction data including a plurality of time periods and a corresponding count of transactions associated with the plurality of time periods, wherein the data files are received directly from a plurality of switches on a communications network;

aggregating all or a portion of the call-transaction data into a data structure on the workstation, wherein the aggregated call-transaction data is associated with one or more of a certain week and a certain month;

automatically identifying a maximum count from the call-transaction data;

identifying a time indication corresponding to the maximum count; and automatically presenting the maximum count and the corresponding time indication.

10. The method of claim 9, wherein the call-transaction data includes a date.

11. The method of claim 9, wherein the data structure is a spreadsheet.

12. The method of claim 9, wherein the maximum count is a call-usage identifier.

13. The method of claim 12, wherein the call-usage identifier is a trunk-usage indication.

14. The method of claim 9, wherein the time indication corresponding to the maximum count denotes a peak hour.

15. The method of claim 9, wherein the presenting the maximum count and the corresponding time indication, further comprises:

displaying the maximum count and the time indication in a printed report document;

displaying the maximum count and the time indication on the Internet; and displaying the maximum count and the time indication within a graphical-user interface.

16. One or more computer-storage media having computer-usable instructions embodied thereon for performing a method of using a workstation to process report files related to call transactions to forecast demand for processing resources, the method comprising:

scheduling, via a scheduling program running on the workstation, a specific date and time for automatic retrieval of one or more report files from an identifiable directory on a storage device associated with a server, said one or more data files including a balance report file that refers to an amount of storage resources used by the server during a specified month;

retrieving the one or more data files from the server at the scheduled date and time; aggregating the one or more data files into the data structure;

determining at least one maximum-transaction indication from the data structure; and presenting the at least one maximum-transaction indication.

17. The method of claim 16, wherein the one or more data files are call-usage log files having the following indications:

an identification number;
a yearly date;
an hour;
a transaction count; and
a status indication.

18. The method of claim 16, wherein merging the one or more data files includes sorting the one or more data files into a list, wherein the list is a sorted list based on a plurality of transaction indications.

19. The method of claim 18, wherein the plurality of transaction indications comprises a number of call record transactions per hour.

20. The method of claim 16, wherein the data structure is a document, a spreadsheet, or a database table.

21. The method of claim 16, wherein the list includes an hour corresponding to the at least one maximum-transaction indication, the hour is a peak hour of the at least one maximum-transaction indication.

22. The method of claim 16, wherein presenting the at least one maximum-transaction indication further comprises:
   displaying the top five maximum-transaction indications in a printed report document;
   displaying the top five maximum-transaction indications on the Internet; and
   displaying the top five maximum-transaction indications within a graphical-user interface.

23. One or more computer-storage media having computer-useable instructions embodied thereon for performing a method of determining a peak-transaction value corresponding to an hour in order to forecast peak-processing usage on a communications network, the method comprising:
   receiving, at a workstation, a plurality of report files from an identifiable directory on a storage device associated with a server, wherein receiving the plurality of report files comprises copying the report files from the identifiable directory, and further wherein each of the plurality of report files includes a transaction count, an hour, and a date;
   creating a directory on a storage device associated with the workstation;
   storing the plurality of copied report files in the directory on the storage device associated with the workstation;
   opening a data structure that identifies field headers within the data files and creates header fields based upon the identified field headers;
   inserting information from each of the plurality of report files under appropriate header fields within the data structure;
   identifying a peak hour corresponding to a maximum transaction count; and
   presenting the peak hour and the maximum transaction count.

24. The method of claim 23, wherein the report files are created by condensing call-usage log files.

25. The method of claim 24, wherein the call-usage log files are retrieved by the server from each communications switch associated with a communications network.

26. The method of claim 23, further comprising sorting in an ascending or descending order the transaction data.

27. The method of claim 26, wherein the data structure is a document, a spreadsheet, a database table, or a combination thereof.

28. The method of claim 23, wherein the maximum transaction count includes a call-volume number.

29. The method of claim 28, wherein the call-volume number is a binary number, a bandwidth value, or a call-traffic number.

30. The method of claim 23, wherein presenting the peak hour and the maximum indication, further comprises:
   displaying the peak hour and the maximum transaction count in a printed report document;
   displaying the peak hour and the maximum transaction count on the Internet; and
   displaying the peak hour and the maximum transaction count within a graphical-user interface.

* * * * *